Oct. 14, 1969
J. V. GOULD ET AL
3,471,920
PRESSURE VESSEL CONSTRUCTION
Filed Aug. 28, 1967
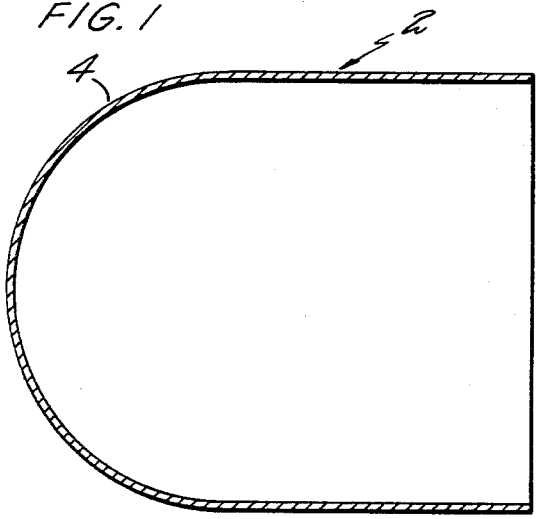
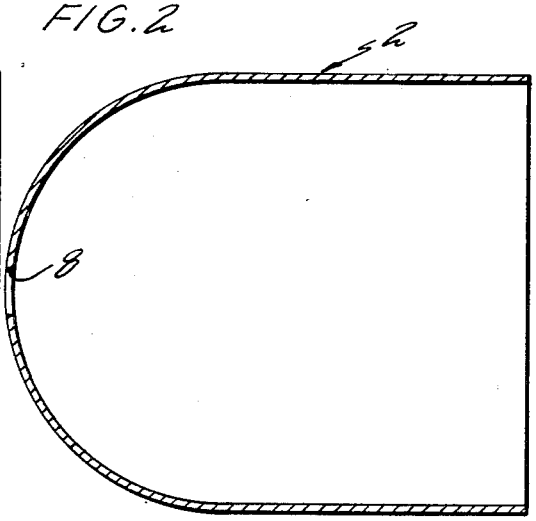
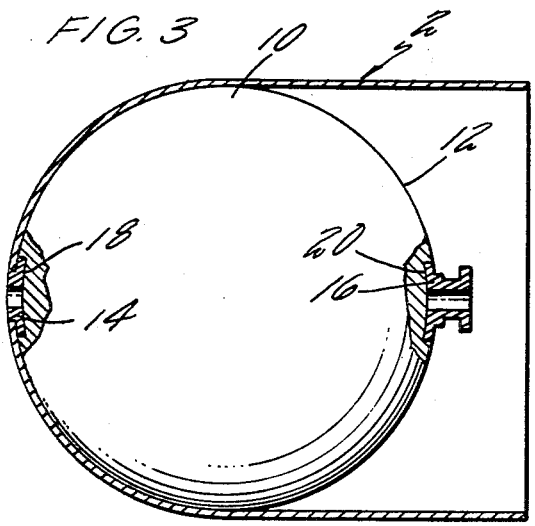
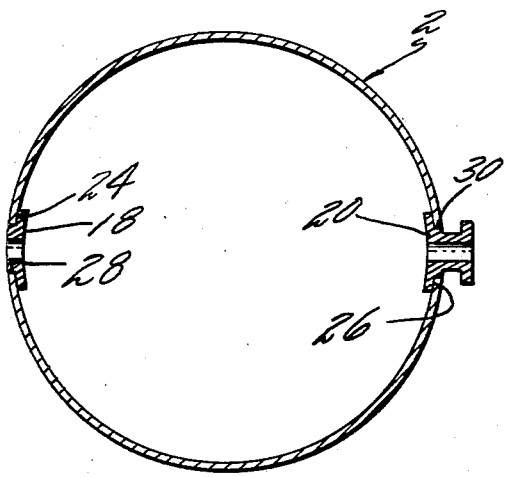
INVENTORS
GEORGE W. JAHRSTORFER
JOHN V. GOULD
BY Richard N. James.
ATTORNEY

United States Patent Office 3,471,920
Patented Oct. 14, 1969

3,471,920
PRESSURE VESSEL CONSTRUCTION
John V. Gould, Windsor Locks, and George W. Jahrstorfer, Wapping, Conn., assignor to United Aircraft Corporation, East Hartford, Conn., a corporation of Delaware
Filed Aug. 28, 1967, Ser. No. 663,645
Int. Cl. B23p 17/00, 25/00
U.S. Cl. 29—423                          3 Claims

ABSTRACT OF THE DISCLOSURE

A method of fabricating seamless pressure vessels from a single piece of sheet stock wherein the end closure is formed over an expendable mandrel carrying flanged fittings, the mandrel material subsequently being removed from the interior of the pressure vessel by melting and/or chemical etching.

BACKGROUND OF THE INVENTION

The present invention relates in general to metal fabrication techniques and, more particularly, to those techniques employed in the formation of pressure vessels wherein a high strength-to-weight ratio is desired.

In the more conventional fabrication procedures for forming particles of the type described casting or powder metallurgy techniques are frequently utilized to form seamless structures, or separate segments of the vessel are formed from sheet stock of the appropriate dimensions and subsequently joined by welding or other means to provide the finished article. The sheet stock vessel thus produced, however, is necessarily characterized by a wall discontinuity at the junction between the individual segments, particularly a girth seam weld, and this wall discontinuity has been found to be disadvantageous or intolerable in many applications where a high strength-to-weight ratio is required.

SUMMARY OF THE INVENTION

The present invention describes a method for fabricating seamless pressure vessels from a single piece of sheet stock, thus providing means for incorporating the advantageous strength properties of the sheet material in a seamless article. There is also provided by the present method convenient means for incorporating into such pressure vessels all of the requisite fittings in such a way that they will be subjected to compression loading upon internal pressurization of the tank.

According to one aspect of the invention, one of the vessel end closures is formed around an expendable mandrel formed of a low melting point alloy which is subsequently removed by melting and/or chemical etching.

In the most preferred embodiment a single flat sheet of the tank containment material is hydroformed into a shell having a hemispherical end closure at one end and a cylindrical open extension at the other end. An expendable mandrel carrying the appropriate fittings is positioned in the cylindrical opening and the cylindrical portion of the shell is spun against the mandrel to form the second end closure and entrap the fittings, the mandrel material subsequently being removed and the fittings being brazed into place to form a leak-tight seal.

BRIEF DESCRIPTION OF THE DRAWING

The most preferred operational sequence of the present invention is set forth in the attached drawing in which:

FIG. 1 illustrates the initial formation of a shell having a hemispherical end closure.

FIG. 2 shows the shell of FIG. 1 after machining to provide a pressure fitting port and/or adjustment of the cylindrical end portion in terms of its length.

FIG. 3 illustrates the shell of FIG. 2 following insertion of the expendable mandrel with embedded pressure fittings.

FIG. 4 shows the fabricated spherical tank with continuous wall characteristics.

DETAILED DESCRIPTION OF THE PREFERRED EMBODIMENTS

In the formation of a spherical pressure vessel according to the most preferred method as illustrated in the drawing, flat sheet stock is first formed into a shell 2 having a hemispherical end portion 4 and an extending cylindrical portion 6. The length of the cylindrical portion is such that the second end closure of the pressure vessel may be made and, of course, if the length is excessive at this stage of fabrication it may be trimmed to the correct length. The conventional hydroforming process is readily adapted to the production of the shell in the shape illustrated and is accordingly recommended.

Subsequent to the formation of the shell of FIG. 1, the appropriate machining of the shell may conveniently be accomplished such as the provision of port 8, as illustrated in FIG. 2.

It will be noted that the shell of FIG. 2 is formed such that the opening of the cylindrical portion corresponds to the maximum internal diameter of the finished article and is therefore adapted to receive therein an expendable mandrel 10 which, in external contour and dimension, corresponds to the internal configuration of the pressure vessel. While such a configuration is preferred, it is evident that only the configuration at the hemispherical surface 12 of the mandrel is critical since it is normally only against that surface of the mandrel that the shell is worked.

The mandrel material is preferably cast from a low melting point alloy, such as "Cerrobend," which may subsequently be removed by simple melting of the material. However, other materials are obviously usable in the present process as long as they are compatible with the sheet material, stable at the spinning temperature, and capable of selective removal from the interior of the pressure vessel when the fabrication of the shell has been completed.

The mandrel 10 is cast or otherwise formed with the appropriate fittings, such as those indicated in FIG. 3 at 14 and 16, embedded therein. The fittings may either be embedded in the surface of the mandrel, as shown in FIG. 3, with the mandrel orientation being such that the fittings are received in the appropriate ports in the shell, fitting 14 into port 8, for example, or, more preferably, the requisite fittings may be completely embedded in the mandrel to provide a smooth external contour to the mandrel for simplification of the spinning operation. Of course, any fitting which may be passed into the interior of the completed shell through the major opening subsequent to the spinning operations need not be embedded in the mandrel material, although at least the largest fittings will be so embedded.

An important feature of the present invention is the provision of means whereby the fittings will be retained in the tank under compression loading upon internal pressurization of the tank. Accordingly, both fittings 14 and 16 are provided with contoured flange portions 18 and 20, respectively, over which the shell is formed or positioned, the forces on the fittings thereby being accommodated in compression along the contacting surfaces 24 and 26. In the more conventional seamless pressure vessel constructions the fittings are welded in place and the internal forces are resisted in shear at the welds.

The mandrel has herein been illustrated as a solid sphere, but in some applications it may be hollow, the only requirement in this regard being sufficient strength to resist the working of the shell thereagainst without deformation. It has been found that the conventional spinning gtechniques are satisfactorily employed in closing the cylindrical end portion of the shell over the mandrel. Further, although the construction of a spherical pressure vessel has been described and illustrated and a spherical mandrel has been used, the present process is adapted to provide pressure vessels of various configurations, the spinning step being adapted to the generation of any shape of revolution.

Upon completion of the shell formation steps and subsequent to the removal of the mandrel material from the interior of the vessel, the fittings are connected to the shell at surfaces 28 and 30 to form a hermetic seal. Since the fundamental purpose for the connection is a basic sealing function, the pressure differential forces being accommodated at surfaces 24 and 26, simple brazing or soldering techniques will normally be found to be satisfactory.

It will be evident to those skilled in the art that there has been provided by this invention a convenient method for fabricating seamless pressure vessels from sheet stock material by a process compatible with metal working facilities currently available. Similarly, the utility of the products of the instant method in flightweight hardware is apparent. While the invention has been illustrated and described in connection with a particular preferred embodiment, the description is intended as illustrative only, the true scope of the invention being measured by the appended claims.

What is claimed is:

1. The method of fabricating a seamless pressure vessel having at least one port providing access thereinto comprising the steps of:
   forming a single piece of sheet stock into a shell having one end substantially closed to form the first end of the pressure vessel, the other end being open and generally cylindrical in shape;
   forming an expendable mandrel of a material which is selectively removable from the sheet stock, at least a portion of the mandrel surface having the contour and dimensions corresponding to those desired at the second end of the pressure vessel;
   embedding at least one flanged fitting in the mandrell, the diameter of the flange thereon exceeding the diameter of the appropriate port provided in the fabricated pressure vessel;
   inserting the mandrel in the correct position in the shell opening;
   spinning the cylindrical portion of the shell against the mandrel to form the second end closure of the pressure vessel and entrap the flanged fitting;
   selectively removing the mandrel from the interior of the vessel;
   and affixing the fitting to the shell port in a hermetic seal.

2. The method of fabricating a seamless pressure vessel having at least one port providing access thereinto comprising the steps of:
   hydroforming a single piece of sheet stock into a shell one end of which is closed forming the first end of the pressure vessel, the other end being open and generally cylindrical in shape, the diameter of the opening corresponding to the maximum internal diameter of the vessel at the second end of the vessel;
   casting an expandable mandrel of a low melting point alloy to the desired internal contour of the vessel;
   embedding the desired number of flanged fittings in the mandrel, the diameter of the respective flanges exceeding the diameter of the respective ports provided in the shell;
   inserting the mandrel into the opening in the shell in the appropriate position and the orientation;
   spinning the cylindrical portion of the shell against the mandrel to form the second end closure of the pressure vessel and entrap the flanged fittings;
   heating the shell to melt the mandrel material and removing the melt from the interior of the vessel;
   and forming a leak-tight joint between the shell and the respective fittings.

3. The method of claim 2 in which:
   the end closures of the pressure vessel are formed substantially as hemispheres;
   and the fittings are joined to the shell in a brazing operation.

References Cited
UNITED STATES PATENTS

| | | | |
|---|---|---|---|
| 955,698 | 4/1910 | Schatz. | |
| 2,833,029 | 5/1958 | Kearns | 29—423 |
| 3,130,487 | 4/1964 | Mears | 29—424 |

THOMAS H. EAGERS, Primary Examiner

U.S. Cl. X.R.
29—148.4, 424, 529